US009926436B2

(12) United States Patent
Morriss

(10) Patent No.: US 9,926,436 B2
(45) Date of Patent: Mar. 27, 2018

(54) ASPHALT INCLUDING MODIFIED TONER BASED ADDITIVE

(71) Applicant: CLOSE THE LOOP TECHNOLOGIES PTY LTD., Somerton (AU)

(72) Inventor: Steve Morriss, Research (AU)

(73) Assignee: CLOSE THE LOOP TECHNOLOGIES PTY LTD., Somerton, Victoria (AU)

( * ) Notice: Subject to any disclaimer, the term of this patent is extended or adjusted under 35 U.S.C. 154(b) by 0 days.

(21) Appl. No.: 14/205,697

(22) Filed: Mar. 12, 2014

(65) Prior Publication Data

US 2014/0275357 A1    Sep. 18, 2014

Related U.S. Application Data

(60) Provisional application No. 61/895,135, filed on Oct. 24, 2013, provisional application No. 61/793,027, filed on Mar. 15, 2013.

(30) Foreign Application Priority Data

Jul. 10, 2013    (AU) ................ 2013902540

(51) Int. Cl.
| C08L 95/00 | (2006.01) |
| C08J 3/22 | (2006.01) |
| C09D 195/00 | (2006.01) |
| C08K 11/00 | (2006.01) |
| C08K 3/34 | (2006.01) |
| C09J 195/00 | (2006.01) |
| E04D 7/00 | (2006.01) |
| C04B 26/26 | (2006.01) |
| C04B 40/00 | (2006.01) |
| E04D 1/20 | (2006.01) |
| C04B 111/00 | (2006.01) |

(52) U.S. Cl.
CPC .............. *C08K 11/00* (2013.01); *C04B 26/26* (2013.01); *C04B 40/0039* (2013.01); *C08K 3/34* (2013.01); *C08K 3/346* (2013.01); *C09D 195/00* (2013.01); *C09J 195/00* (2013.01); *E04D 7/00* (2013.01); *C04B 2111/00586* (2013.01); *E04D 1/20* (2013.01); *Y02W 30/92* (2015.05)

(58) Field of Classification Search
CPC ........... C08L 95/00; C08L 101/00; C08J 3/22; C09D 195/00
USPC ......................................... 524/59
See application file for complete search history.

(56) References Cited

U.S. PATENT DOCUMENTS

| 4,437,896 A | 3/1984 | Partanen |
| 4,759,799 A | 7/1988 | Vicenzi |
| 5,004,772 A | 4/1991 | Grzybowski et al. |
| 5,047,457 A | 9/1991 | Higgins |
| 5,362,316 A | 11/1994 | Paradise |
| 5,618,340 A | 4/1997 | Krogh et al. |
| 5,622,554 A | 4/1997 | Krogh et al. |
| 5,730,791 A | 3/1998 | Krogh et al. |
| 5,834,553 A | 11/1998 | Roberts, Sr. et al. |
| 6,113,681 A | 9/2000 | Tripathi et al. |
| 7,238,230 B1 | 7/2007 | Moss et al. |
| 2006/0074152 A1* | 4/2006 | Graves ............. C08L 95/00 524/68 |
| 2011/0146531 A1* | 6/2011 | Mitra ............. C08K 5/101 106/18.26 |
| 2011/0196073 A1* | 8/2011 | Fee ............. C08L 95/00 524/68 |
| 2013/0136855 A1 | 5/2013 | Subotic et al. |
| 2013/0143985 A1* | 6/2013 | Blacklidge ............. C08J 3/20 524/59 |

FOREIGN PATENT DOCUMENTS

| CN | 102617916 A | 8/2012 |
| CN | 102786805 A | 11/2012 |
| CN | 102850906 A | 1/2013 |
| EP | 9941611 B1 | 4/2000 |
| JP | H0873826 A | 3/1996 |
| JP | 2000-169208 | * 6/2000 |
| JP | 2000169208 A | 6/2000 |
| KR | 20020062252 A | 7/2002 |
| KR | 20050001132 A | 1/2005 |
| KR | 10-2002-0035488 | * 1/2006 |
| KR | 20090129546 A | 12/2009 |
| MX | 6009660 A | 2/2008 |
| WO | 03025046 A1 | 3/2003 |
| WO | 2005054344 A1 | 6/2005 |
| WO | 2006107179 A2 | 10/2006 |
| WO | WO 2006/107179 | * 10/2006 |
| WO | 2012131497 A2 | 10/2012 |

OTHER PUBLICATIONS

International Search Report and Written Opinion for International patent application No. PCT/AU2014/000245 dated May 1, 2014.
International Search Report and Written Opinion for International patent application No. PCT/AU2014/000247 dated May 1, 2014.
Yuan, E.; "The Chemistry of Toner Polymers"; Recharger Magazine, Baker Hughes Inc., Nov. 2008, pp. 57-60.
Vargas, M. A., et al.; "Asphalts Modified with SEBS Copolymers Functionalized with Various Amounts of Maleic Anhydride"; http://archivos.labcontrol.cl/wcce8/offline/techsched/manuscripts/x9s1dw.pdf.
Ahmed, N, et al.; "Effect of kaolin and calcined kaolin loading on styrene butadiene rubber composites"; Society of Plastics Engineers, Plastics Research Online, 2014; pp. 1-4, 10.2417/spepro. 005234.
Amme, R.; "Ground Tire Rubber and Trans-Polyoctenamer as Asphalt Binder Additives"; University of Denver, Presentation to the Western Research Institute 2004 Symposium on Additives in Roadway Asphalts, Wyoming Jun. 23-25, 2004, 45 pages.
Evonik Industries; VESTENAMER® 8012—The Rubber Additive with Unique Properties; a registered trademark of the Evonik Degussa GmbH, Germany, Mar. 2009; Distribued by struktol Company of America; 4 pages.
Yildirim, Y, et al.; "The Toner-Modified Asphalt Demostration Projects"; Research Report No. FHWA/TX-5-3933-01-2, Implementation Project 5-3933-01: Toner Modified Asphalt, Center for Transportation Research Bureau of Engineering Research, The University of Texas at Austin, Dec. 2003, 119 pages.

* cited by examiner

*Primary Examiner* — Deve E Valdez
(74) *Attorney, Agent, or Firm* — King & Schickli, PLLC

(57) ABSTRACT

An asphalt and asphalt concrete incorporating a modified toner based additive are provided.

21 Claims, 1 Drawing Sheet

ASPHALT INCLUDING MODIFIED TONER BASED ADDITIVE

This document claims the benefit of priority in U.S. Provisional Patent Application Ser. No. 61/895,135 filed on Oct. 24, 2013, and U.S. Provisional Patent Application Ser. No. 61/793,027 filed on Mar. 15, 2013, the full disclosures of which are incorporated herein by reference.

TECHNICAL FIELD

This document relates generally to the asphalt paving field and more particularly to a modified toner based asphalt additive and a new asphalt pavement composition incorporating that additive.

BACKGROUND

The concept of using unprocessed waste toner to modify asphalt is well known to those skilled in the art. U.S. Pat. No. 6,113,681 (Tripathi et al. 2000) describes compositions and methods for making and using toner modified asphalt compositions. Toner is a powder that is specifically formulated for use in photocopiers and laser printers in order to form printed indicia and images on paper. Toner powder is a very fine dust with particle sizes on the order of 8-16 micrometers and there are hundreds of variations in chemistry, particle size, particle shape and color. Toner incorporates a polymer that is melted in order to bind the printed indicia/image to the paper. That polymer may be styrene acrylate, polyester or styrene butadiene. These different toners produce different physical and mechanical properties in asphalt.

The problems associated with using unprocessed waste toner in asphalt are considerable and this likely explains why this additive has not had any commercial impact to date. Some of the problems associated with the effective and commercially viable use of unprocessed waste toner as an asphalt additive relate to form, variability of raw materials, and OH&S issues associated with handling fine powders. Further, unprocessed waste toner only adds plastomeric properties to asphalt. Such properties improve the high temperature performance of the asphalt. More specifically, the unprocessed waste toner additive increases the stiffness of the asphalt to reduce longitudinal rutting and minimize high-temperature induced microcracking of the road surface. Thus, unprocessed waste toner additive tends to increase the life cycle of the roadway at higher ambient temperatures.

However, when one adds a sufficient amount of unprocessed waste toner to asphalt in order to achieve these high temperature performance benefits, one effectively degrades the low temperature performance of the asphalt. More specifically, at lower ambient temperatures, the increased stiffness provided to the asphalt by the unprocessed waste toner additive becomes a detriment. This is because the added stiffness makes the asphalt more susceptible to cracking in response to each freeze-thaw cycle.

The present document relates to compositions of asphalt incorporating modified toner based additives that overcome all known existing issues. The modified toner based additive described herein is made by mixing waste toner powder with gelling clay, reactive agents, elastomers, functional fillers, handling and agglomerating agents, compatibilizers and mixtures thereof. During the mixing and agglomerating process, the toner undergoes frictional heating, shear, sintering, coalescence, fusion and molecular or polymer chain entanglements of the toner particles. In many embodiments the toner powder particles are subjected to polar-polar interaction with other additive components. For example, FIG. 1 illustrates the polar-polar interaction (note dashed line) between a toner particle T and a treated crumb rubber particle R. FIG. 2 illustrates the polar-polar interactions (note dashed lines) between a compatibilizer C and both a toner particle T and a treated crumb rubber particle R. FIG. 3 illustrates the polar-polar interaction (note dashed line) between a toner particle T and an untreated crumb rubber particle R. Thus, as should be appreciated, the toner particles in the resulting modified toner based additive have undergone a physical change that renders them unsuited for use in photocopiers and laser printers but admirably suited for use as an asphalt additive.

The modified toner based additive is in the form of granules, of perhaps 0.1-2.0 mm, with consistent shape and size giving flowable product with superior handling properties as compared to unprocessed waste toner. Furthermore, the moisture content is consistently between 2 and 15 percent by weight and the toner chemistry is homogenized. Further, unlike unprocessed waste toner, the modified toner based additive improves both the high temperature and low temperature performance of the asphalt to which it is added.

More specifically, the plastomeric properties of the polymer (e.g. styrene acrylate, polyester and/or styrene butadiene) from the toner serve to increase the stiffness of the asphalt to improve the high temperature performance of the asphalt as described above. In addition, where the toner is mixed with a material having elastomeric properties, the increases in stiffness are balanced out and a flexibility is imparted to the asphalt at low temperatures so it is able to better resist cracking in response to freeze-thaw cycles. Thus, while unprocessed waste toner improves the high temperature performance of asphalt at the cost of degrading low temperature performance, the modified toner based additive described herein improves both, thereby representing a significant advance in the art. Further it does so in a single additive with the proper proportion of toner based plastomer and elastomer to provide the best results. Such a product eliminates human error in on site asphalt mixing and is very convenient to use.

The present document also describes a range of new asphalt and asphalt concrete compositions, made possible with the use of additives at the agglomeration stage, that offer vastly superior features and benefits in asphalt when compared to unprocessed toner.

SUMMARY

An asphalt incorporating a modified toner based additive is provided. The asphalt includes between 40 and 99.8 weight percent bitumen and between 0.2 and 60 weight percent modified toner based additive. The modified toner based additive is a mixture of between 18 and 98 weight percent toner and between 2 and 82 weight percent material selected from a group consisting of a gelling clay, a reactive agent, an elastomer, a functional filler, a handling and agglomerating agent and mixtures thereof.

The gelling clay may be selected from a group consisting of montmorillonite clay, kaolin clay, calcined kaolin clay, gilsonite clay, bentonite clay, attapulgite clay and mixtures thereof. The reactive agent may be selected from a group consisting of a peroxide, hydrogen peroxide, benzoyl peroxide, a sulfur containing compound, sulfuric acid, sulfur and mixtures thereof. The elastomer may be selected from a group consisting of latex rubber, crumb rubber, ground tire rubber, waste water-based paint (i.e. acrylic paint) and mixtures thereof. The functional filler may be selected from a group consisting of fly ash, bag house fines, carbon black and mixtures thereof.

The handling and agglomerating agent is selected from a group of materials consisting of an oil, a wax, soybean oil, linseed oil, engine oil, recycled engine oil, vegetable oil, engineering oil, recycled engineering oil, ship oil, recycled ship oil, olive oil, hydraulic oil, hydrogenated castor oil (HCO), hydrogenated palm oil, stearic acid, sasol C80, montan E, paraffin, carnauba wax, slack wax, sasol H1, recycled PE wax, sasobit, CPAO, microcrystalline wax and mixtures thereof.

In another possible embodiment the modified toner based additive includes a first component selected from a group consisting of an oil, a wax, soybean oil, linseed oil, engine oil, recycled engine oil, vegetable oil, engineering oil, recycled engineering oil, ship oil, recycled ship oil, olive oil, hydraulic oil, hydrogenated castor oil (HCO), hydrogenated palm oil, stearic acid, sasol C80, montan E, paraffin, carnauba wax, slack wax, sasol H1, recycled PE wax, sasobit, CPAO, microcrystalline wax, ash, fly ash, bag house fines, carbon black, kaolin clay, calcined kaolin clay, clay, montmorillonite clay, gilsonite clay, bentonite clay, attapulgite clay and mixtures thereof and a second elastomeric component selected from a group consisting of an elastomer, crumb rubber, latex rubber, waste water-based paint, ground tire rubber (GTR) and mixtures thereof. The weight percent ratio of the first component to the second component in the additive is between 1 to 1 and 1 to 10. Further the modified toner based additive includes a weight ratio of toner to elastomer of between 1 to 1 and 1 to 6 so as to provide a single asphalt additive with a proper balance between plastomeric properties of the toner and elastomeric properties of the elastomer so as to improve both the high temperature and low temperature performance of the asphalt.

In yet another embodiment, the modified toner based additive used in the asphalt includes between 0.1 and 7.0 weight percent compatibilizer. That compatibilizer may be in the form of a maleic anhydride (MAH) grafted polymer, benzoyl peroxide (BPO), polyphosphoric acid (PPA), trans polyoctenamer rubber (TOR), and mixtures thereof.

In accordance with an additional aspect an asphalt concrete is provided incorporating a modified toner based additive. The asphalt concrete includes between 70-94.8 weight percent aggregate, between 5 and 15 weight percent bitumen and between 0.2 and 10 weight percent modified toner based additive. The modified toner based additive includes between 18 and 98 weight percent toner and between 2 and 82 weight percent of a material selected from a group consisting of a gelling clay, a reactive agent, an elastomer, a functional filler, a handling and agglomerating agent and mixtures thereof.

BRIEF DESCRIPTION OF THE DRAWING FIGURES

DETAILED DESCRIPTION

Figure 1:
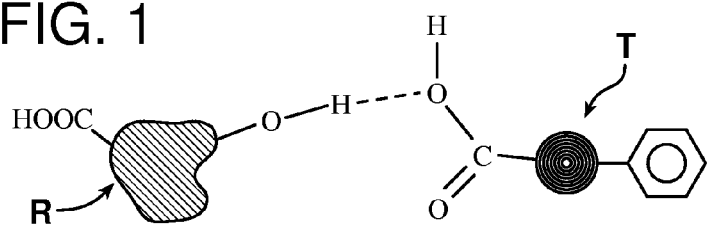
FIG. 1 illustrates polar-polar interaction between a toner particle and a treated crumb rubber particle.

An asphalt is provided incorporating a modified toner based additive. The asphalt includes between 40 and 99.8 weight percent bitumen and between 0.2 and 60 weight percent modified toner based additive. In another possible embodiment the asphalt includes between 50 and 95 weight percent bitumen and between 5 and 50 weight percent modified toner based additive. In yet another possible embodiment the asphalt includes between 60 and 85 weight percent bitumen and between 15 and 40 weight percent modified toner based additive.

The modified toner based additive is a mixture of between 18 and 98 weight percent toner and between 2 and 82 weight percent material selected from a group consisting of a gelling clay, a reactive agent, an elastomer, a functional filler, a handling and agglomerating agent and mixtures thereof. In another possible embodiment the modified toner based additive mixture includes between 25 and 75 weight percent toner and between 25 and 75 weight percent material selected from a group consisting of a gelling clay, a reactive agent, an elastomer, a functional filler, a handling and agglomerating agent and mixtures thereof. In yet another embodiment the modified toner based additive mixture includes between 45 and 60 weight percent toner and between 40 and 55 weight material selected from a group consisting of a gelling clay, a reactive agent, an elastomer, a functional filler, a handling and agglomerating agent and mixtures thereof. In still another embodiment, the additive mixture includes between 20 and 50 weight percent toner and between 50 and 80 weight percent of the material selected from a group consisting of a gelling clay, a reactive agent, an elastomer, a functional filler, a handling and agglomerating agent and mixtures thereof.

In one embodiment, the gelling clay is selected from a group including, but not necessarily limited to montmorillonite clay, kaolin clay, calcined kaolin clay, gilsonite clay, bentonite clay, attapulgite clay and mixtures thereof.

In one embodiment, the reactive agent is selected from a group of such agents including, but not necessarily limited to a peroxide, hydrogen peroxide, benzoyl peroxide, a sulfur containing compound, sulfuric acid, sulfur and mixtures thereof. The reactive agents react with rubber in the additive (e.g. ground tire rubber, crumb rubber) to modify the surface of the rubber to better allow bonding with thermoplastics, such as the polymer in the toner, and/or asphaltenes in the bitumen of the asphalt.

In one embodiment, the elastomer is selected from a group of elastomeric materials including, but not necessarily limited to latex rubber, crumb rubber, ground tire rubber, waste water-based paint and mixtures thereof.

In one embodiment, the functional filler is selected from a group of materials including, but not necessarily limited to ash, fly ash, bag house fines, carbon black and mixtures thereof. Functional fillers do more than standard fillers. For example, carbon black reduces oxidation damage to asphalt by increasing resistance to UV light. As another example, kaolin clay and calcined kaolin improve the mechanical properties, such as stress-strain properties, of plastomers such as the styrene butadiene found in some toner powders.

In one embodiment the handling and agglomerating agent is selected from a group of materials consisting of an oil, a wax, soybean oil, linseed oil, engine oil, recycled engine oil, vegetable oil, engineering oil, recycled engineering oil, ship oil, recycled ship oil, olive oil, hydraulic oil, hydrogenated castor oil (HCO), hydrogenated palm oil, stearic acid, sasol C80, montan E, paraffin, carnauba wax, slack wax, sasol H1, recycled PE wax, sasobit, microcrystalline wax, and mixtures thereof.

For purposes of this document, an unmodified listed ingredient includes new and recycled material while a listed ingredient modified by the term "recycled" includes only recycled material. Further, "crumb rubber" refers to both untreated and treated crumb rubber. Treated crumb rubber has been subjected to controlled chemical treatments to modify the surface of the rubber particles in order to enhance the properties of the rubber for use in asphalt. Many surface treatments involve oxidation of the outer molecules. Treated crumb rubber products are available from a number of manufacturers including, but not necessarily limited to, Rubber Research Elastomerics (Tirecycle product), Vredestein Rubber Recycling (Surcrum product) and Texas Encore Corporation (Activated Tire Rubber, ATR product).

In another embodiment the modified toner based additive includes a first component selected from a group consisting of an oil, a wax, soybean oil, linseed oil, engine oil, recycled engine oil, vegetable oil, engineering oil, recycled engineering oil, ship oil, recycled ship oil, olive oil, hydraulic oil, hydrogenated castor oil (HCO), hydrogenated palm oil, stearic acid, sasol C80, montan E, paraffin, carnauba wax, slack wax, sasol H1, recycled PE wax, sasobit, microcrystalline wax, ash, fly ash, bag house fines, carbon black, kaolin clay, calcined kaolin clay, clay, montmorillonite clay, gilsonite clay, bentonite clay, attapulgite clay and mixtures thereof and a second elastomeric component selected from a group consisting of an elastomer, crumb rubber, latex rubber, waste water-based paint, ground tire rubber and mixtures thereof. In this embodiment the weight percent ratio of the first component to the second component in the additive is between 1 to 1 and 1 to 10. In any of the embodiments the modified toner based additive may include a weight ratio of toner to elastomer of between 1 to 1 and 1 to 6 so as to provide a single asphalt additive with a proper balance between plastomeric properties of the toner and elastomeric properties of the elastomer so as to improve both high temperature and low temperature performance of the asphalt.

The toner powder utilized in the modified toner additive is a polymer based material and, for example, may be selected from a group consisting of styrene acrylate-based toner powder, polyester-based toner powder, styrene-butadiene-based toner powder, tricomponent, dual component, mono component, magnetic, non-magnetic, black, color and mixtures thereof. The toner powder may include black toner, cyan toner, yellow toner, magenta toner, special colors and combinations thereof. Waste toner powder from used toner cartridges, bottles and other vessels or containers, waste hoppers, drums, gaylords, super sacs or tankers may be recycled and used in the modified toner powder additive. Toner powder may also be derived from new, faulty or out of date toner cartridges, bottles or other containers. Toner powder so used includes dry toner powder, toner press cake and combinations thereof having a moisture content of 1-40%. In one possible embodiment the toner powder includes less than 10% moisture content prior to mixing with the handling and agglomerating agent. In another possible embodiment, the toner powder includes more than 40% moisture content prior to mixing with the handling and agglomerating agent.

The modified toner based additive is prepared by mixing the toner press cake and/or dry toner powder with any of the desired gelling clays, reactive agents, functional fillers, elastomers and/or handling and agglomerating agents in, for example, a sigma blade or intensive mixer at very high shear rates. When this mixing is completed at moderate temperatures (from 40 to 70° C.) any elastomeric material in the mixture (e.g. waste water-based paint, latex rubber, crumb rubber, ground tire rubber) is submitted to thermal expansion. This thermal expansion opens the pores, cavities and pockets of the elastomeric material. The particles of toner are received in these open pores, cavities and pockets of the elastomer during mixing where they stick or cling in place and become entrapped as the elastomeric material cools. Thus, the toner particles and elastomer material undergo a physical change during the mixing process which produces a more useful product.

In one useful embodiment, the additive includes is a toner/elastomer composite made with between 0.1 and 7.0 weight percent compatibilizer. In another useful embodiment, it is made with/includes between 1.0 and 5.0 weight percent compatibilizer. Such a compatibilizer may be selected from a group of materials consisting of a maleic anhydride (MAH) grafted polymer, benzoyl peroxide (BPO), polyphosphoric acid (PPA), trans polyoctenamer rubber (TOR), and mixtures thereof. Such compatibilizers are commercially available under a number of different trademarks including, but not necessarily limited to, Licocene Performance Polymer from Clariant, Elvaloy from Dupont, Vestenamer from Evonik Industries, Kraton from Shell Chemical Co., and Ceramer from Baker Petrolite.

Figure 2:
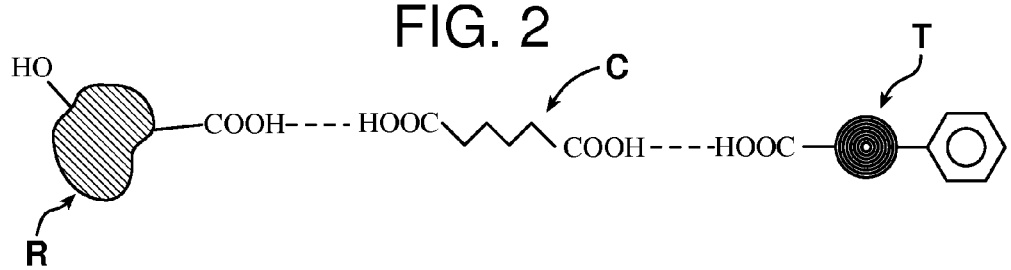
FIG. 2 illustrates polar-polar interaction between a compatibilizer, a toner particle and a crumb rubber particle.
Figure 3:
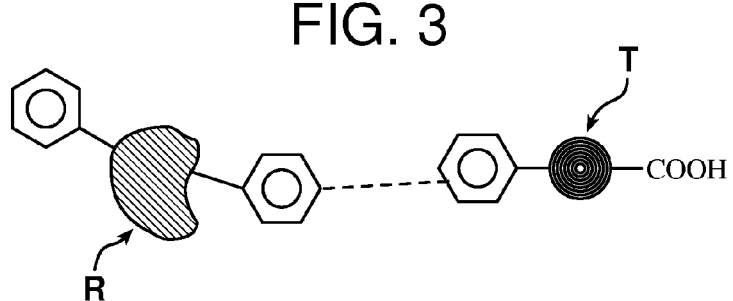
FIG. 3 illustrates polar-polar interaction between an untreated crumb rubber particle and a toner particle.
Figure 4:
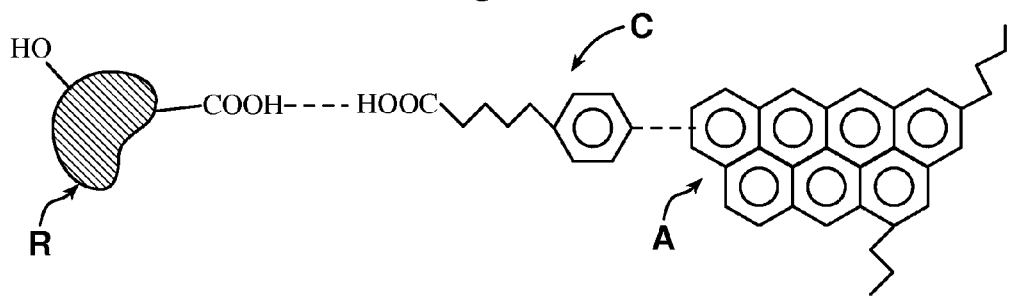
FIG. 4 illustrates polar-polar interaction between a treated crumb rubber particle, a compatibilizer and an asphaltene found in bitumen.

Advantageously, the compatibilizer includes functional structures, such as benzene rings and carboxylic acid groups, that are available to provide sites for polar-polar interaction with complementary sites on the polymer portions of the toner particles and elastomers, such as crumb rubber (see toner particle T, compatibilizer C and crumb rubber particle R in FIG. 2). When an additive, including compatibilizer, is mixed with bitumen in an asphalt, the compatibilizer C functions to help establish polar-polar interactions between, for example, treated crumb rubber particles R and the asphaltenes A in the bitumen (see FIG. 4). While not shown in the drawing figures, the compatibilizer may also function to help establish similar polar-polar interactions between the toner particles and the asphaltenes. Further, the compatibilizer may even help establish a chain of polar-polar interactions between a chain of elastomer particles, toner particles and the asphaltenes. It is hypothesized that these polar-polar interactions enhance the desirable properties of the asphalt or asphalt concrete incorporating the modified toner powder additive.

In accordance with an additional aspect, an asphalt concrete is provided incorporating a modified toner based additive. The asphalt concrete includes between 70-94.8 weight percent aggregate, between 5 and 15 weight percent bitumen and between 0.2 and 10 weight percent modified toner based additive. In another possible embodiment the asphalt concrete includes between 75 and 90 weight percent aggregate, between 5 and 12 percent bitumen and between 0.2 and 10 percent modified toner based additive.

The modified toner based additive includes between 18 and 98 weight percent toner and between 2 and 82 weight percent material selected from a group consisting of a gelling clay, a reactive agent, an elastomer, a functional filler, a handling and agglomerating agent and mixtures thereof just as described above. The modified toner based additive may also include 0.1 to 7.0 weight percent compatibilizer as described above. In yet another alternative embodiment, the modified toner additive in the asphalt concrete includes 1.0 to 5.0 weight percent compatibilizer as described above.

It should be appreciated that the asphalt and asphalt concrete compositions described in this document may also include other asphalt additives known to be useful by those skilled in the art. Such additives include, but are not limited to fibers, release agents and emulsifiers. The following examples will further illustrate the invention.

Example 1

90-95 weight percent aggregate, 4-6 weight percent bitumen and 0.2-2 weight percent modified toner based additive are mixed in an asphalt mixer at a temperature of between 120 and 200° C. to produce a homogeneous asphalt cement. The modified toner based additive used in this asphalt cement comprises 92 weight percent dry toner powder mixed with 8 weight percent recycled engine oil in a high speed (intensive) mixer for twenty minutes at 50° C. to produce a homogeneous mixture.

Example 2

84-91 weight percent, 4-6 weight percent bitumen and 5-10 weight percent modified toner based additive are mixed in an asphalt mixer at a temperature of between 120 and 200° C. to produce a homogeneous asphalt concrete. The modified toner based additive used in this asphalt cement comprises 40-85 weight percent toner press cake mixed with 18-60 weight percent ground tire rubber (50 mesh) and 1-5 weight percent recycled oil in a sigma blade mixer for 25 minutes at 52° C. to produce a homogeneous mixture.

Example 3

87-91 weight percent aggregate, 3-5 weight percent bitumen and 6-10 weight percent modified toner based additive are mixed in an asphalt mixer at a temperature of between 120 and 200° C. to produce a homogeneous asphalt concrete. The modified toner based additive used in this asphalt cement comprises 40-85 weight percent ground tire rubber (50 mesh), 18-60 weight percent toner press cake and 2-7 weight percent recycled oil in a homogeneous mixture.

Example 4

80-87 weight percent aggregate, 3-5 weight percent bitumen and 10-15 weight percent modified toner based additive are mixed in an asphalt mixer at a temperature of between 120 and 200° C. to produce a homogeneous asphalt concrete. The modified toner based additive used in this asphalt concrete comprises 40-75 weight percent ground tire rubber (50 mesh), 18-60 weight percent toner press cake, 2-10 weight percent dry toner powder and 5-15 weight percent recycled oil in a homogeneous mixture.

Example 5

80-85 weight percent aggregate, 3-5 weight percent bitumen and 8-15 weight percent modified toner based additive are mixed in an asphalt mixer at a temperature of between 120 and 200° C. to produce a homogeneous asphalt concrete. The modified toner based additive used in this asphalt cement comprises 40-85 weight percent ground tire rubber (50 mesh), 18-60 weight percent toner press cake, 2-7 weight percent recycled oil and 2-8% recycled acrylic paint in a homogeneous mixture.

Example 6

The additive of this example contains between 0.1 and 0.5% compatibilizer (Vestenamer product sold by Evonik Industries), and from 0.5 to 3.0% recycled oil combined with between 40 and 50% toner powder, and 45 and 55% GTR in a high speed mixer. The asphalt concrete of example 6 consists of 85-95 weight percent aggregate, 3-5 weight percent bitumen and 4-7 weight percent modified toner based additive mixed in an asphalt mixer at a temperature of between 120 and 200° C.

Example 7

The additive of this example contains between 3.0 and 5.0% compatibilizer (Licocene PP MA 6452), and 0.5 to 2.5% recycled water based paint, combined with between 35 and 50% toner powder, and 40 and 65% GTR in a high speed mixer. The asphalt concrete of example 7 consists of 80-90 weight percent aggregate, 3-5 weight percent bitumen and 5-10 weight percent modified toner based additive mixed in an asphalt mixer at a temperature of between 120 and 200° C.

Example 8

In yet another example, the additive contains 45-55% crumb rubber, 25-35% toner powder, 10-15% recycled acrylic paint, 3-5% fly ash, 1-3% montmorillonite clay and 1-3% MAH grafted PE. The additive is mixed in a high speed mixer at a temperature of between 10-70° C. The asphalt concrete made with the additive includes 80-85 weight percent aggregate, 3-5 weight percent bitumen and 8-15 weight percent modified toner based additive.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An asphalt comprising bitumen and a modified toner based additive, wherein the modified toner based additive comprises oil, waste water-based paint, ground tire rubber and polymer chain entangled toner, wherein the polymer chain entangled toner and the ground tire rubber have a polar-polar interaction.

2. The asphalt of claim 1, wherein the asphalt comprises between 40 and 99.8 weight percent of the asphalt is bitumen and between 0.2 and 60 weight percent of the asphalt is modified toner based additive.

3. The asphalt of claim 2, wherein said modified toner based additive comprises:
   between 18 and 98 weight percent of the modified toner based additive being polymer chain entangled toner; and
   between 2 and 82 weight percent of the modified toner based additive being oil.

4. The asphalt of claim 3, wherein said modified toner based additive includes a first component, selected from a first group consisting of an oil, a wax, soybean oil, linseed oil, engine oil, recycled engine oil, vegetable oil, engineering oil, recycled engineering oil, ship oil, recycled ship oil, olive oil, hydraulic oil, hydrogenated castor oil (HCO), hydrogenated palm oil, stearic acid, paraffin, carnauba wax, slack wax, recycled PE wax, microcrystalline wax, ash, fly ash, bag house fines, carbon black, attapulgite clay, and mixtures thereof and a second elastomeric component selected from a second group consisting of an elastomer, crumb rubber, latex rubber, ground tire rubber and mixtures thereof.

5. The asphalt of claim 4, wherein a weight percent ratio of said first component to said second elastomeric component in said modified toner based additive is between 1 to 1 and 1 to 10.

6. The asphalt of claim 4 wherein a weight percent ratio of toner to second elastomeric component in said additive is between 1 to 1 and 1 to 6.

7. The asphalt of claim 3, wherein said modified toner based additive mixture comprises between 0.1 and 7.0 weight percent of the modified toner based additive being compatibilizer.

8. The asphalt of claim 1, wherein said modified toner based additive includes a weight percent ratio of toner to elastomer of between 1 to 1 and 1 to 6 so as to provide a single asphalt additive with a proper balance between plastomeric properties of said toner and elastomeric properties of said elastomer to improve both high temperature and low temperature performance of said asphalt.

9. The asphalt of claim 8, wherein said compatibilizer is selected from a group of materials consisting of maleic anhydride (MAH) grafted polymer, benzoyl peroxide (BPO), polyphosphoric acid (PPA), trans polyocternamer rubber (TOR) and mixtures thereof.

10. The asphalt of claim 1, wherein the modified toner based additive further comprises a material selected from a group consisting of a gelling clay, a reactive agent, an elastomer, a handling and agglomerating agent, a functional filler and mixtures thereof.

11. The asphalt of claim 10, wherein said gelling clay is selected from a group consisting of montmorillonite clay, kaolin clay, calcined kaolin clay, gilsonite clay, bentonite clay, attapulgite clay and mixtures thereof.

12. The asphalt of claim 10, wherein said reactive agent is selected from a group consisting of a peroxide, hydrogen peroxide, benzoyl peroxide, a sulfur containing compound, sulfuric acid, sulfur and mixtures thereof.

13. The asphalt of claim 10, wherein said functional filler is selected from a group consisting of fly ash, bag house fines, ash, carbon black and mixtures thereof.

14. The asphalt of claim 10, wherein said handling and agglomerating agent is selected from a group consisting of an oil, a wax, soybean oil, linseed oil, engine oil, recycled engine oil, vegetable oil, engineering oil, recycled engineering oil, ship oil, recycled ship oil, olive oil, hydraulic oil, hydrogenated castor oil (HCO), hydrogenated palm oil, stearic acid, montan E, paraffin, carnauba wax, slack wax, recycled PE wax, microcrystalline wax and mixtures thereof.

15. The asphalt of claim 1, wherein the ground tire rubber comprises 2-25 weight percent of the modified toner additive.

16. The asphalt of claim 1, wherein the waste water-based paint comprises 2-25 weight percent of the modified toner additive.

17. The asphalt of claim 1, wherein the modified toner based additive comprises 2-25 weight percent of the modified toner based additive being ground tire rubber and 2-20 weight percent of the modified toner based additive being waste water-based paint.

18. The asphalt of claim 1, wherein oil comprises 2-15 weight percent of the modified toner based additive.

19. The asphalt of claim 1, wherein the modified toner based additive further comprises 2-10 weight percent cellulose fibers.

20. The asphalt of claim 1, wherein the ground tire rubber comprises between 18 and 85 weight percent of the modified toner additive.

21. The asphalt of claim 1, wherein the modified toner based additive is formed by high shear mixing at a temperature of between 40-70° C.

* * * * *